US008670323B1

(12) United States Patent
Croak et al.

(10) Patent No.: US 8,670,323 B1
(45) Date of Patent: Mar. 11, 2014

(54) METHOD AND APPARATUS FOR MONITORING OF ACCESS NETWORK STATUS IN COMMUNICATION NETWORKS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 755 days.

(21) Appl. No.: 11/109,103

(22) Filed: Apr. 19, 2005

(51) Int. Cl.
*H04L 1/00* (2006.01)

(52) U.S. Cl.
USPC .......................................... 370/237; 370/353

(58) Field of Classification Search
USPC ....................................................... 370/352
See application file for complete search history.

(56) References Cited

U.S. PATENT DOCUMENTS

| | | | |
|---|---|---|---|
| 6,373,842 B1* | 4/2002 | Coverdale et al. | 370/394 |
| 7,289,434 B2* | 10/2007 | Fedorkow et al. | 370/219 |
| 7,782,813 B2* | 8/2010 | Wheeler et al. | 370/328 |
| 2002/0101860 A1* | 8/2002 | Thornton et al. | 370/352 |
| 2004/0218583 A1* | 11/2004 | Adan et al. | 370/352 |
| 2006/0067323 A1* | 3/2006 | Beck et al. | 370/395.2 |

* cited by examiner

*Primary Examiner* — Wanda Z Russell

(57) ABSTRACT

A method and apparatus for enabling a tool to collect alerting information of network disruptions across access networks external to a packet network, e.g., a VoIP network, is disclosed. By monitoring the status of external access networks, service disruptions in the VoIP network that can be potentially caused by such access networks can be anticipated, prevented, diagnosed and/or resolved rapidly.

11 Claims, 4 Drawing Sheets

METHOD AND APPARATUS FOR MONITORING OF ACCESS NETWORK STATUS IN COMMUNICATION NETWORKS

The present invention relates generally to communication networks and, more particularly, to a method and apparatus for monitoring of access network status in packet networks, e.g. Voice over Internet Protocol (VoIP) networks.

BACKGROUND OF THE INVENTION

Events may occur in networks (such as access networks) that are external to a packet network provider, e.g., a VoIP network provider that can impact the service quality of the VoIP network. For example, residential subscribers often access VoIP networks through cable or Digital Subscriber Line (DSL) networks using terminal adaptors connected to cable or DSL modems. If a cable or DSL network is temporarily down or seriously impaired, incoming calls destined to these affected subscribers cannot be successfully completed. All of these incoming calls are instead redirected to voice mail which can cause overload conditions in Media Servers (MS) that play out voice mail announcements and are usually engineered at a lower capacity level than basic call loads. Broadly defined, a Media Server (MS) is a special server that typically handles and terminates media streams, and to provide services such as announcements, bridges, transcoding, and Interactive Voice Response (IVR) messages. Consequently, many of these calls get blocked and customer dissatisfaction will result.

Therefore, a need exists for a method and apparatus for monitoring of access network status.

SUMMARY OF THE INVENTION

In one embodiment, the present invention enables a tool to collect alerting information of network disruptions across access networks external to a packet network, e.g., a VoIP network. By monitoring the status of external access networks, service disruptions in the VoIP network that can be potentially caused by such access networks can be anticipated, prevented, diagnosed and/or resolved rapidly.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
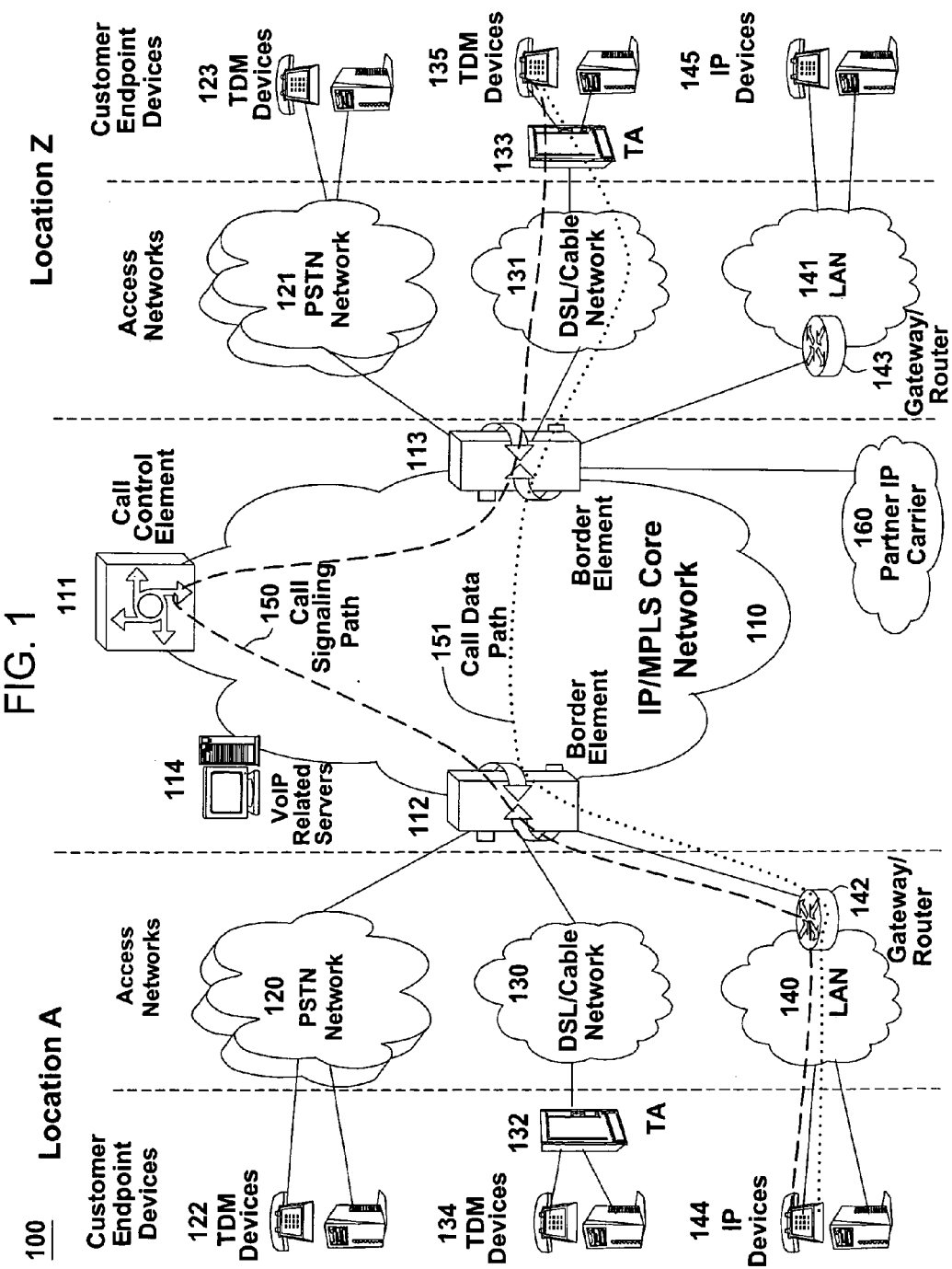
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Events may occur in networks (such as access networks) that are external to a packet network provider, e.g., a VoIP network provider, that can impact the service quality of the VoIP network. For example, residential subscribers often access VoIP networks through cable or Digital Subscriber Line (DSL) networks using terminal adaptors connected to cable or DSL modems. If a cable or DSL network is temporarily down or seriously impaired, incoming calls destined to these affected subscribers cannot be successfully completed. All of these incoming calls are instead redirected to voice mail which can cause overload conditions in Media Servers (MS) that play out voice mail announcements and are usually engineered at a lower capacity level than basic call loads. Broadly defined, a Media Server (MS) is a special server that typically handles and terminates media streams, and to provide services such as announcements, bridges, transcoding, and Interactive Voice Response (IVR) messages. Consequently, many of these calls get blocked and customer dissatisfaction will result.

To address this need, the present invention enables a tool to collect alerting information of network disruptions across access networks external to a packet network, e.g., a VoIP network. By monitoring the status of external access networks, service disruptions in the VoIP network that can be potentially caused by such access networks can be anticipated, prevented, diagnosed and/or resolved rapidly.

Figure 2:
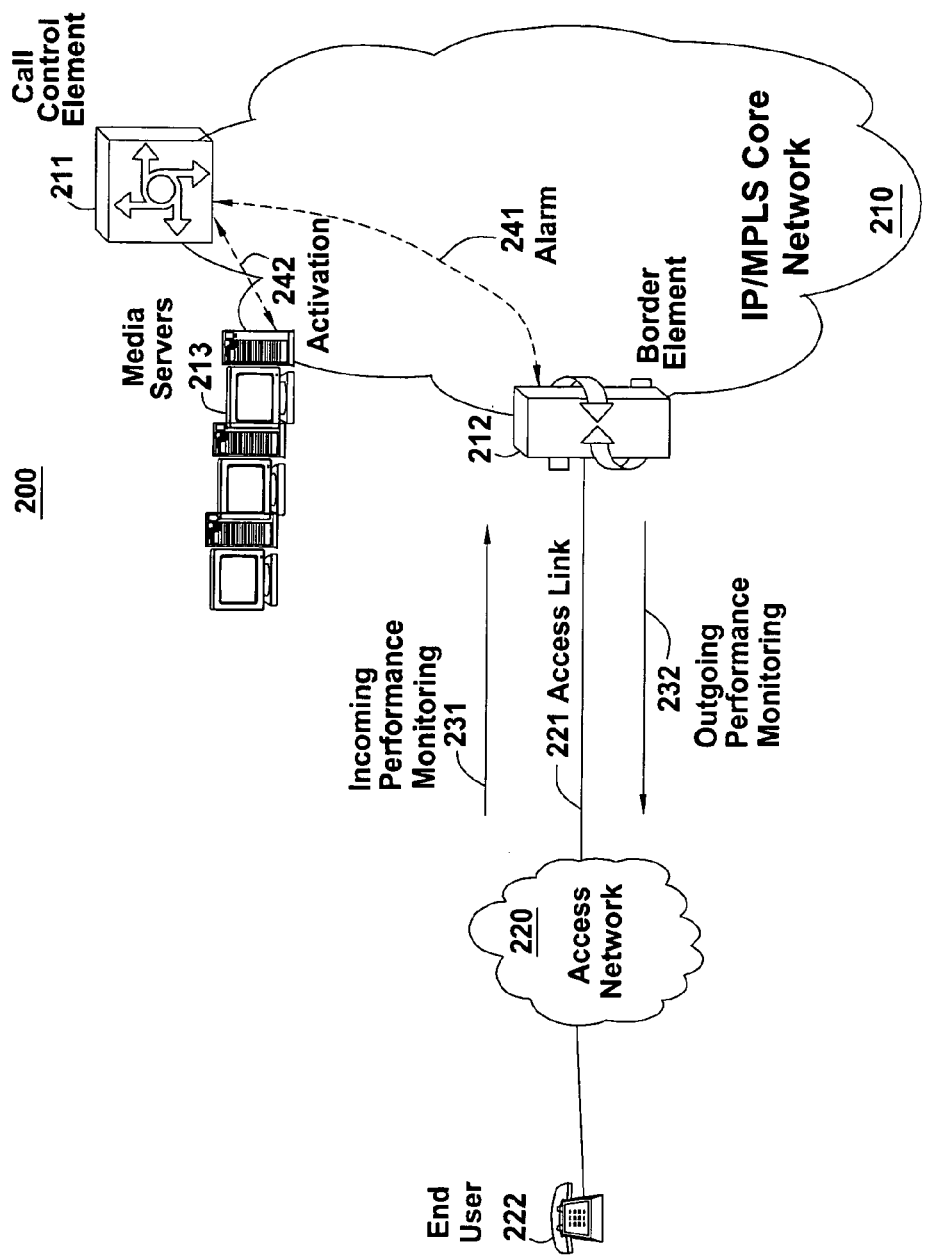
FIG. 2 illustrates an example of monitoring of access network status in a VoIP network of the present invention.

FIG. 2 illustrates an example of monitoring access network performance monitoring in a packet network 210, e.g., a VoIP network. In FIG. 2, end user 222 is connected to the VoIP network via access network 220 using access link 221. The performance and network status of access network 220 and access link 221 are monitored by BE 212 in both the incoming direction 231 and the outgoing direction 232. When the performance level of access network 220 or access link 221 has become unacceptable or unavailable, BE 212 will raise an alarm, 241, to CCE 211 to warn the VoIP network provider of the access network problem. CCE 211 in turn can activate the appropriate standby network elements, using flow 242, to anticipate the increase in call and service processing load on certain network elements due to the access network problem. For instance, when access network 220 is down, calls destined to the endpoints supported by the down access network 220 will be redirected to voice mail boxes by BE 212. This produces an increase in Media Server (MS) 213 processing load in handling increased incoming voice mail volume due to the access network failure. CCE 211 can activate an additional standby MS to help handle and relieve the increased processing load on the currently active MS 213.

In one embodiment, the standby network elements are hot standby elements or components. A hot standby component is a secondary component which is running simultaneously with the primary component that can, within a very short period of time (e.g., in the range of mili-seconds), be switched over to backup or augment the primary component. When used in the backup mode, the hot standby component can simply take over the function of the primary component if the primary component fails. When used in the augmentation mode, the hot standby component can augment the processing capacity of the primary component when the primary component is getting overloaded.

Figure 3:
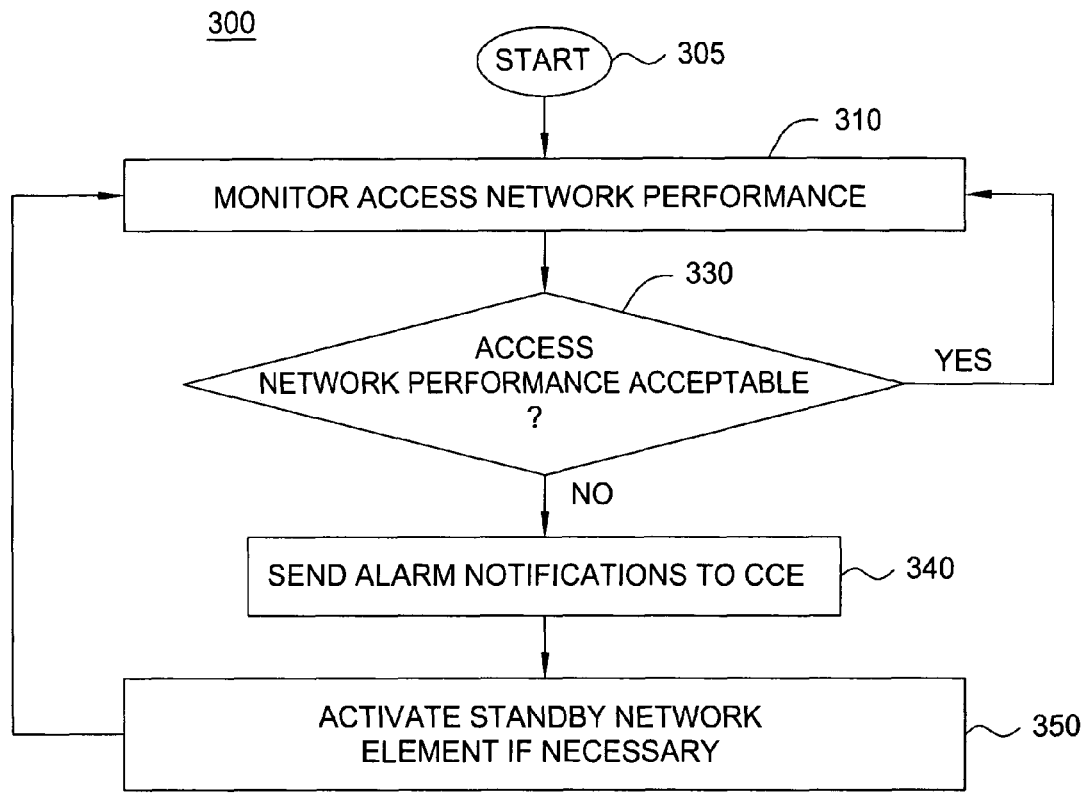
FIG. 3 illustrates a flowchart of a method for monitoring of access network status in a VoIP network of the present invention.

FIG. 3 illustrates a flowchart of a method 300 for monitoring of access network status in a VoIP network. Method 300 starts in step 305 and proceeds to step 310.

In step 310, the method 300 monitors access network performance in both the incoming and outgoing directions. Performance parameters being monitored include, but are not limited to, packet loss, packet delay, and packet jitter.

In step 330, the method checks if the performance level is acceptable. If the performance level is unacceptable, the method proceeds to step 340; otherwise, the method proceeds back to step 310.

In step 340, the method sends an alarm notification to warn the network provider of the access network performance issues. In step 350, the method, if necessary, activates the appropriate standby network element to anticipate the increase in call and service processing load on particular network elements due to the access network problem and the method proceeds back to step 310. The appropriate standby network elements can be activated by the method when processing load on those particular network elements reach a capacity threshold pre-defined by the network provider.

Figure 4:
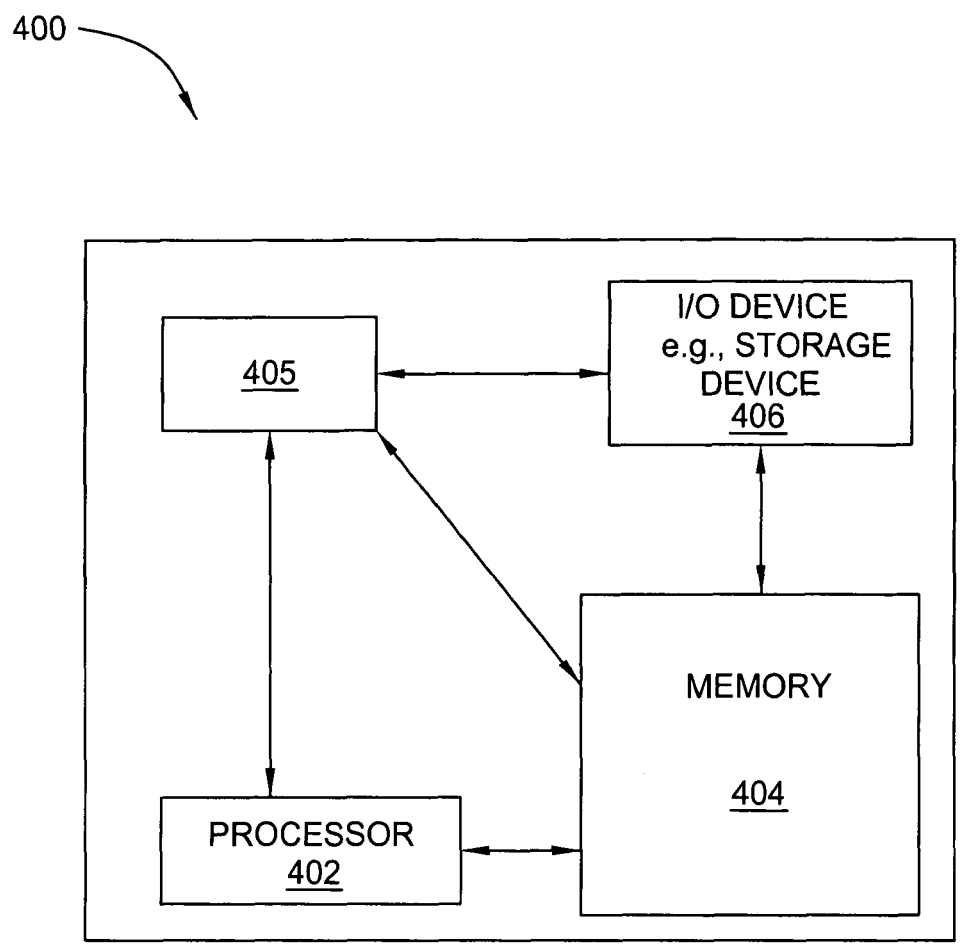
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an access network status monitoring module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present access network status monitoring module or process 405 can be loaded into memory 404 and executed by processor 402 to implement the functions as discussed above. As such, the present access network status monitoring process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a performance level of an access network in a core communication network, comprising:
   monitoring by a processor of a border element deployed within the core communication network the performance level of the access network connected to the core communication network, wherein the access network is external to the core communication network, and is deployed between the core communication network and an end user device, wherein the core communication network comprises an internet protocol network;
   raising by the processor of the border element an alarm indication if the performance level falls below a pre-defined threshold set by a network provider of the core communication network; and
   sending by the processor of the border element the alarm indication to a call control element for activating an additional standby network element that is associated with a network element deployed within the core communication network that is impacted by the performance level falling below the pre-defined threshold, wherein the network element that is impacted and the standby network element perform a same network function, wherein the standby network element is a media server, wherein the call control element upon receiving the alarm indication activates the additional standby network element to handle an increase in processing load.

2. The method of claim 1, wherein the performance level is monitored in both an incoming direction and an outgoing direction with respect to the core communication network.

3. The method of claim 1, wherein the pre-defined threshold represents a minimum level of acceptable performance of the access network.

4. The method of claim 1, wherein the additional standby network element is a hot standby network element.

5. A non-transitory computer-readable medium storing a plurality of instructions which, when executed by a processor of a border element, cause the processor to perform operations for monitoring a performance level of an access network in a core communication network, the operations comprising:
   monitoring the performance level of the access network connected to the core communication network, wherein the border element is deployed within the communication network, wherein the access network is external to the core communication network, and is deployed between the core communication network and an end user device, wherein the core communication network comprises an internet protocol network;
   raising an alarm indication if the performance level falls below a pre-defined threshold set by a network provider of the core communication network; and
   sending the alarm indication to a call control element for activating an additional standby network element that is associated with a network element deployed within the core communication network that is impacted by the performance level falling below the pre-defined threshold, wherein the network element that is impacted and the standby network element perform a same network function, wherein the standby network element is a media server, wherein the call control element upon receiving the alarm indication activates the additional standby network element to handle an increase in processing load.

6. The non-transitory computer-readable medium of claim 5, wherein the performance level is monitored in both an incoming direction and an outgoing direction with respect to the core communication network.

7. The non-transitory computer-readable medium of claim 5, wherein the pre-defined threshold represents a minimum level of acceptable performance of the access network.

8. The non-transitory computer-readable medium of claim 5, wherein the additional standby network element is a hot standby network element.

9. A system for monitoring a performance level of an access network in a core communication network, comprising:
   a border element deployed in the core communication network, wherein the border element comprises:
      a processor; and
      a computer-readable medium storing a plurality of instructions which, when executed by the processor, cause the processor to perform operations, the operations comprising:
         monitoring the performance level of the access network connected to the core communication network, wherein the access network is external to the core communication network, and is deployed between the core communication network and an end user device, wherein the core communication network comprises an internet protocol network;
         raising an alarm indication if the performance level falls below a pre-defined threshold set by a network provider of the core communication network; and
         sending the alarm indication to a call control element for activating an additional standby network element that is associated with a network element deployed within the core communication network that is impacted by the performance level falling below the pre-defined threshold, wherein the network element that is impacted and the standby network element perform a same network function, wherein the standby network element is a media server, wherein the call control element upon receiving the alarm indication activates the additional standby network element to handle an increase in processing load.

10. The apparatus of claim 9, wherein the performance level is monitored in both an incoming direction and an outgoing direction with respect to the core communication network.

11. The apparatus of claim 9, wherein the pre-defined threshold represents a minimum level of acceptable performance of the access network.

\* \* \* \* \*